(12) United States Patent  
Kandpal

(10) Patent No.: US 9,823,996 B2
(45) Date of Patent: Nov. 21, 2017

(54) DEBUGGING CODE FOR CONTROLLING INTELLIGENT DEVICES USING LOG DATA FROM EXECUTED OBJECT CODE

(71) Applicant: Landis+Gyr Innovations, Inc., Alpharetta, GA (US)

(72) Inventor: Tribhuwan Chandra Kandpal, Alpharetta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 350 days.

(21) Appl. No.: 14/645,451

(22) Filed: Mar. 12, 2015

(65) Prior Publication Data

US 2016/0266997 A1    Sep. 15, 2016

(51) Int. Cl.
*G06F 9/44*     (2006.01)
*G06F 11/36*    (2006.01)

(52) U.S. Cl.
CPC ...... *G06F 11/3656* (2013.01); *G06F 11/3636* (2013.01)

(58) Field of Classification Search
None
See application file for complete search history.

(56) References Cited

U.S. PATENT DOCUMENTS

| | | |
|---|---|---|
| 5,394,544 A | 2/1995 | Motoyama et al. |
| 6,901,581 B1 * | 5/2005 | Schneider ........... G06F 11/3664 714/E11.212 |
| 8,136,096 B1 * | 3/2012 | Lindahl ............... G06F 11/3636 714/45 |
| 2003/0188299 A1 * | 10/2003 | Broughton ............. G06F 8/427 717/141 |
| 2005/0010912 A1 * | 1/2005 | Adolphson ........... G06F 8/4441 717/151 |

(Continued)

FOREIGN PATENT DOCUMENTS

| | | |
|---|---|---|
| WO | 2011089478 | 7/2011 |
| WO | 2015061022 | 4/2015 |

OTHER PUBLICATIONS

U.S. Appl. No. 15/146,042, "Notice of Allowance", dated Jul. 27, 2017, 6 pages.

(Continued)

*Primary Examiner* — Insun Kang
(74) *Attorney, Agent, or Firm* — Kilpatrick Townsend & Stockton LLP

(57) ABSTRACT

In some aspects, a debugging application can obtain log data from a target device. The log data can be generated from the execution of object code by the target device. The object code can be generated from assembly code for the target device. For each of multiple program counter entries in the log data, the debugging application can identify a correspondence between the program counter entry and a respective portion of the assembly code and simulate a respective operation performed by the execution of the object code. The simulated operation corresponds to the program counter entry. Simulating the execution can include configuring a display device to display a visual indicator for the portion of the assembly code that caused a given operation. The visual indicator is displayed based on the identified correspondence between a portion of the assembly code and a program counter entry from the log data.

17 Claims, 6 Drawing Sheets

(56) References Cited

U.S. PATENT DOCUMENTS

| | | | |
|---|---|---|---|
| 2005/0289400 A1* | 12/2005 | Kimura | G06F 11/3636 714/45 |
| 2006/0259824 A1* | 11/2006 | Sohm | G06F 11/323 714/38.13 |
| 2007/0226702 A1 | 9/2007 | Segger et al. | |
| 2008/0127149 A1* | 5/2008 | Kosche | G06F 8/443 717/158 |
| 2008/0178143 A1* | 7/2008 | Dougan | G06F 8/20 717/100 |
| 2008/0244533 A1* | 10/2008 | Berg | G06F 11/3447 717/128 |
| 2008/0250397 A1* | 10/2008 | Dahms | G06F 11/3624 717/129 |
| 2009/0106604 A1* | 4/2009 | Lange | G06F 11/261 714/45 |
| 2009/0235246 A1 | 9/2009 | Seal et al. | |
| 2010/0287539 A1* | 11/2010 | Park | G06F 11/3636 717/130 |
| 2011/0075704 A1 | 3/2011 | Bettendorff et al. | |
| 2012/0084759 A1* | 4/2012 | Candea | G06F 11/3612 717/126 |
| 2013/0019228 A1 | 1/2013 | Bates et al. | |
| 2013/0055217 A1* | 2/2013 | Boxall | G06F 11/3624 717/129 |
| 2014/0359375 A1* | 12/2014 | Longobardi | G06F 11/1471 714/45 |
| 2015/0332043 A1 | 11/2015 | Russello | |
| 2016/0110281 A1* | 4/2016 | Cheng | G06F 11/3664 714/38.1 |

OTHER PUBLICATIONS

Li et al., "Research of Stub remote debugging technique", Computer Science&Education, 2009 ICCSE'09, 4th International Conference on IEEE, Piscataway, NJ, USA, Jul. 25, 2009, pp. 990-994.

PCT/US2017/028081, "International Search Report and Written Opinion", dated Jun. 30, 2017, 14 pages.

* cited by examiner

DEBUGGING CODE FOR CONTROLLING INTELLIGENT DEVICES USING LOG DATA FROM EXECUTED OBJECT CODE

TECHNICAL FIELD

This disclosure relates generally to computer software and more particularly relates to debugging code for controlling intelligent devices using log data from executed object code.

BACKGROUND

Devices such as radios, utility meters, and other electronic tools may include processing capabilities that allow the devices to be remotely controlled or configured. For example, an intelligent utility meter can execute commands such as transmitting collected data to a head-end server, loading configuration data that controls one or more operating parameters of the meter, modifying operations in response to external conditions (e.g., daylight savings time changeover, time of day, etc.). These processing capabilities can be provided using relatively simple programming languages that do not require complex operating systems.

These types of intelligent devices may have limited memory storage or other computing resources. For example, a given device may be unable to store program code larger than four or eight kilobytes. The limitations on memory storage or other computing may prevent at least some debugging features from being included in the program code that is used to operate the intelligent device.

The omission of debugging features from program code that is used to operate an intelligent device can present disadvantages. For example, a developer may be unable to accurately or efficiently identify which portion of program code is causing a malfunction or other issue in the operation of an intelligent device. An inability to accurately or efficiently identify portions of program code that cause malfunctions or other issues may increase the time and costs associated with developing program code to control intelligent devices. Furthermore, inability to accurately identify portions of program code that cause malfunctions or other issues may cause developers to make errors when attempting to correct these malfunctions or other issues in the program code, which can negatively impact the operation of the intelligent device.

It is desirable to provide improved debugging features for program code used to control intelligent devices with limited computing resources.

SUMMARY

Systems and methods are disclosed for debugging code for controlling intelligent devices using log data from executed object code. In some aspects, a debugging application can obtain log data from a target device. The log data can be generated from the execution of object code by the target device. The object code can be generated from assembly code for the target device. For each of multiple program counter entries in the log data, the debugging application can identify a correspondence between the program counter entry and a respective portion of the assembly code and simulate a respective operation performed by the execution of the object code. The simulated operation corresponds to the program counter entry. Simulating the execution can include configuring a display device to display a visual indicator for the portion of the assembly code that caused a given operation. The visual indicator is displayed based on the identified correspondence between a portion of the assembly code and a program counter entry from the log data.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
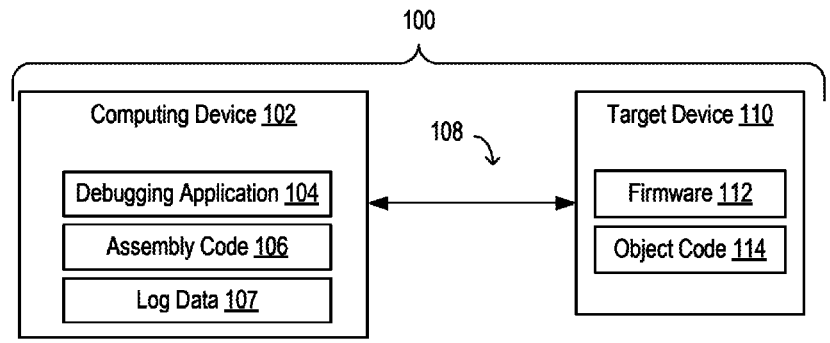
FIG. 1 is a block diagram illustrating an example of a system that can use log data generated from the execution of object code by a target device to debug code used to control the target device.

Systems and methods are provided for debugging assembly code (and, in some aspects, associated source code) for controlling intelligent devices using log data from executed object code. The assembly code is used to generate object code for a target device, and the debugging can be performed without including breakpoints in the object code. Debugging assembly code and/or its associated source code without including breakpoints in the object code can improve the operation of target devices (e.g., transceivers, utility meters, etc.) having processing resources that are insufficient for supporting complex debugging features.

The following example is used to introduce (without limitation) certain aspects of this disclosure. For example, a program for a transceiver or other target device can be written in source code (e.g., C++ or another suitable programming language), which is then used to generate assembly code (e.g., a set of machine instructions) and its corresponding object code (e.g., a set of numerical opcodes corresponding to the machine instructions). In some aspects, the assembly code can be generated without using a higher-level source code. The target device may have limited computing resources (e.g., memory, processing power, etc.), which may prevent the target device from utilizing breakpoints or other resource-intensive debugging features. A debugging application that is executed on a computing device separate from the target device can provide these debugging features for the assembly code and/or its associated source code without including breakpoints in the object code itself. For example, the debugging application can obtain electronic log data that is generated by the execution of the object code at the target device. The debugging application can automatically identify a correspondence between certain program counter entries in the log data and certain portions of the source code. The debugging application can use the identified correspondence to simulate the operations performed during the execution of the object code. For example, the debugging application can use the correspondence between program counter entries and assembly code and/or its associated source code portions to highlight or otherwise visually indicate certain portions of the assembly code and/or its associated source code that correspond to certain operations performed during the execution of the object code.

In some aspects, the electronic log data can also include data in addition to the program counter entries. For example, a given log entry can include one or more of an opcode value (e.g., a numerical code) corresponding to a certain processor operation specified in the assembly code, a value stored in a flag register that indicates a state of a processor at the time of the operation, and/or values stored in one or more other registers that are generated by the processor performing the operation. The debugging application can use register values and/or opcode values to identify the correspondence between certain portions of the assembly code and/or its associated source code and certain operations performed by the execution of the object code.

In additional or alternative aspects, the debugging application can provide a breakpoint function in the simulation of the assembly code and/or its associated source code. The breakpoint function can simulate the behavior of breakpoints in the assembly code and/or its associated source code without including the breakpoints in the assembly code and/or its associated source code itself or the resulting object code. For example, a breakpoint file separate from the assembly code and/or its associated source code can identify one or more portions of the assembly code and/or its associated source code that are associated with breakpoints. Using the separate breakpoint file to associate a given breakpoint with a respective portion of the assembly code and/or its associated source code can allow the object code to be generated from the assembly code and/or its associated source code without the object code including the breakpoint or otherwise being affected by the breakpoint. During a simulated execution of the object code, the debugging application can determine that a given portion of the assembly code and/or its associated source code, which corresponds to one or more simulated operations, is identified in the breakpoint file or is otherwise associated with a breakpoint. The debugging application can pause the simulation based on determining that the assembly code and/or its associated source code corresponding to the operation is identified in the breakpoint file or is otherwise associated with the breakpoint.

In some aspects, the debugging application can perform the simulation while the target device continues to execute the object code. For example, the log data can be generated by the target device and provided to the computing device over a suitable data connection. An example of a suitable data connection is a connection via a transparent port of the target device or another interface of the target device that can transmit byte-oriented communication data to the computing device via a serial data connection. The simulation can be performed based on the log data received from the target device. Performing the simulation using the log data can allow the simulation to be paused at breakpoints without affecting the operation of the target device. Thus, the execution of the object code at the target device continues independently of the simulation being paused at the computing device.

As used herein, the tem "source code" is used to refer to high-level programming instructions that are written using human-readable plain text. Source code can include functions that are defined independently of specific computing architectures. The source code can be converted by a compiler application into assembly code that is specific to a given computing architecture. Examples of source code include C, C++, C#, VISUAL BASIC, JAVA, PYTHON, PERL, JAVASCRIPT, ACTIONSCRIPT, etc.

As used herein, the term "assembly code" is used to refer to a low-level programming language for a computing device that provides a strong correspondence (e.g., a one-to-one correspondence) between commands of the assembly code and instructions that are executable by the computing device.

As used herein, the term "object code" is used to refer to a set of instructions including commands that are directly executable by the computing device. The instructions in object code can be specified using a machine code language (e.g., binary code). For example, object code can include a file that includes a set of opcodes for a computing device that are specified in hexadecimal notation.

As used herein, the term "opcode" is used to refer to a numerical representation (e.g., a binary number written in hexadecimal notation) corresponding to an instruction from assembly code.

As used herein, the term "program counter" is used to refer to a register (e.g., a rapid-access, bit-level memory storage location) used by a processing device to store an address (e.g., a pointer value) of an instruction that is being executed by the processing device or the next instruction to be executed by the processing device. An example of a program counter is a latch that can be incremented and/or reset to zero in response to commands.

As used herein, the term "flag register" is used to refer to a register used by a processing device to store a set of bits that indicate a current state of the processing device.

As used herein, the term "byte-oriented communication data" is used to refer to data that is transmitted using a communication protocol that uses full bytes (i.e., eight bits) to represent control codes defined by the communication protocol. Such a protocol may use an entire byte to communicate a command signal to a receiving device, with control characters included in the header and trailer of each data byte.

In additional or alternative aspects, debugging assembly code and/or its associated source code using log data from object code that is executed by a target device can obviate the need to include breakpoints or other complex debugging features from the assembly code, the associated source code, and/or the object code. Omitting breakpoints or other complex debugging features from the assembly code and/or its associated source code and/or the object code can allow for more effective debugging of assembly code and/or its associated source code used to control target devices with limited computing resources. For example, a target device may have limited memory, processing power, or other computing resources. This limitation may prevent the target device from utilizing breakpoints or other resource-intensive debugging features. For example, the target device may be a radio or other transceiver device with a limited amount of available memory storage (e.g., four or eight kilobytes). The memory storage may be sufficient to store relatively simple commands specified in the object code, but may be insufficient to handle more complex debugging features (e.g., configuring the transceiver device to pause all operations in response to a breakpoint). Thus, it may be impracticable or infeasible to include breakpoints or similar debugging features in the object code, the assembly code, and/or the source code that is used to generate the object code. Utilizing log data generated by the target device can allow the execution of the object code to be accurately simulated such that developers can identify errors or other issues in the assembly code and/or its associated source code even if the target device cannot support complex debugging features.

In additional or alternative aspects, debugging assembly code and/or its associated source code using log data from object code that is executed by a target device can allow the assembly code and/or its associated source code to be debugged more effectively than would be achieved by emulating the behavior of the target device in software. For example, even if a computing device having sufficient computing resources to support complex debugging features is used to execute the object code, the operation of the target device may be sufficiently complex that the computing device cannot accurately emulate the behavior of the target device in a deployment environment. For example, a target device may be a radio that is deployed in a mesh network. The radio may perform different operations in response to various conditions in the mesh network (e.g., quality of communication links, number of nodes in the mesh network, etc.). The number of different conditions or combinations thereof that affect the operations performed by the radio may be too large to emulate in software. Additionally or alternatively, it may be infeasible to identify the effects of certain conditions that affect the operations performed by the radio or to model the effects of those conditions in software. Utilizing log data generated by the target device in a real-world deployment environment can allow the execution of the object code to be accurately simulated in a manner that allows developers to identify errors or other issues in the assembly code and/or its associated source code resulting from operation of the target device in the deployment environment.

These illustrative examples are given to introduce the reader to the general subject matter discussed here and are not intended to limit the scope of the disclosed concepts. The following sections describe various additional aspects and examples with reference to the drawings in which like numerals indicate like elements.

Referring now to the drawings, FIG. 1 is a block diagram illustrating an example of a system that can use log data generated from the execution of object code by a target device to debug code used to control the target device. The system 100 depicted in FIG. 1 includes one or more computing devices 102 and one or more target devices 110.

The computing device 102 can include one or more processing devices that execute a debugging application 104. The debugging application 104 can debug assembly code 106 that is used to control a target device. The assembly code 106 can be debugged using log data 107 that is generated in response to the target device 110 executing object code 114 that is generated from the assembly code 106. For example, the log data 107 can be used by the debugging application 104 to simulate, at the computing device 102, the execution of the object code 114. The simulated execution of the object code 114 can be selectively paused without affecting operations of the target device 110. The simulation can allow a developer to identify the effects of specific assembly code portions and/or associated source code portions on specific operations of the target device 110 without requiring breakpoints or other complex debugging features to be included in the assembly code 106 and/or the object code 114.

The computing device 102 can include any device or group of devices that can execute the debugging application 104. The debugging application 104, assembly code 106, and log data 107 can be stored in one or more non-transitory computer-readable media that are included in, or accessible to, the computing device 102. Examples of a computing device 102 include a laptop, a tablet computer, a server system, etc.

The target device 110 can include any device or group of devices that is configured to perform one or more end-user functions. Examples of a target device 110 include a metering device that monitors consumption of power or other resources by a building or structure, a radio or other transceiver device that transmits and receives signals, or some combination thereof.

The target device 110 can include one or more processing devices that are configured by firmware 112 to perform operations. The firmware 112 can be stored on a non-transitory computer-readable medium of the target device 110. For example, the firmware 112 can include instructions that are embedded on the target device 110 (e.g., via storage to a read-only memory). The firmware 112 can include one or more executable instructions that are used for controlling one or more hardware components of the target device 110. The firmware 112 can communicate directly with a hardware component of the target device 110 without requiring interaction with a high-level operating system.

The target device 110 can also access and execute the object code 114 to perform one or more operations in addition to those operations specified in the firmware 112. The object code 114 can include a set of opcodes that are directly executable by a processing device of the target device. The opcodes can be used to provide customized operations of the target device 110 without changing the firmware 112. For example, if the target device 110 is a radio, the object code 114 can be used to customize features of the radio, such as the transmission or reception frequencies used by the radio or other modifiable configuration settings for the radio.

FIG. 1 depicts the firmware 112 and the object code 114 as separate modules for illustrative purposes. However, other implementations are possible. For example, the object code 114 may be a program module within the firmware 112.

One or more of the firmware 112 and the object code 114 can include functions for logging events generated by the operation of the target device 110. For example, an operation of a processing device of the target device 110 can be associated with a certain state. An example of a state of the processing device can include an arithmetic or logical function being performed by the processing device, register values associated with the function, etc. Executing one or more of the firmware 112 and the object code 114 can configure the target device 110 to generate or update log data 107. The log data 107 can include data describing different states of one or more components of the target device 110 during execution of the object code 114. Examples of this data include program counter values, register values, etc.

The computing device 102 can communicate with the target device 110 via one or more suitable communication links 108. The communication link 108 depicted in FIG. 1 can represent links established via one or more interfaces. In some aspects, the communication link 108 can include a wired connection between the computing device 102 and the target device 110. For example, one or both of the computing device 102 and the target device 110 can include a serial communication interface (e.g., an RS-232 serial port, an RS-232/486 serial port, etc.). The communication link 108 can be established by connecting a suitable communication cable to each of the serial communication interfaces. The communication link 108 can be used to communicate byte-oriented communication data between the computing device 102 and the target device 110. Examples of such communication data include updates to the firmware 112, updates to the object code 114, updates to other programming code used by the target device 110, log data 107, etc. In additional or alternative aspects, the communication link 108 can include wireless communication between the computing device 102 and the target device 110. For example, the computing device 102 and the target device 110 may include wireless RF transceivers used to communicate with one another. In additional or alternative aspects, the communication link 108 can include multiple communication links that involve both wireless communication and wired connections. For example, relatively small files (e.g., object code 114) can be transmitted via a wireless communication link, and larger files (e.g., log data 107) can be transmitted via a wired, serial connection.

Figure 2:
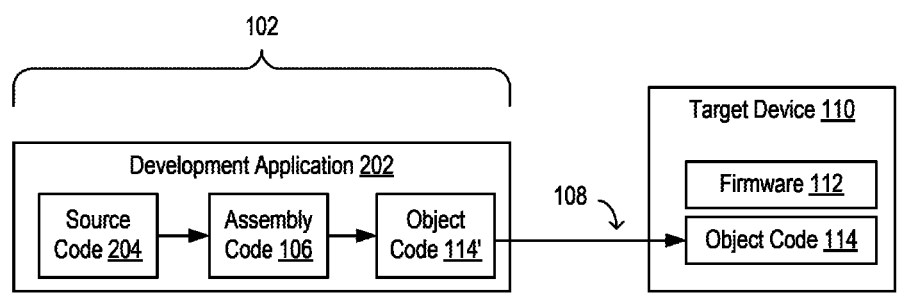
FIG. 2 is a block diagram illustrating an example of the computing device of FIG. 1 generating the object code from the assembly code and associated source code.

The object code 114 can include machine-readable instructions that are generated using the assembly code 106. FIG. 2 is a block diagram illustrating an example of the computing device 102 generating the object code 114 using the assembly code 106.

The assembly code 106 can be created, modified, or otherwise used by a development application 202. The development application 202 can provide one or more features for developing computer-executable program code, such as, for example, a source code editor, a compiler, an assembler, etc. The computing device can use the development application 202 to generate object code and can provide the generated object code to the target device 110. For illustrative purposes, FIG. 2 depicts a copy of the object code 114' that is generated on the computing device 102 and a copy of the object code 114 that is stored on the target device 110. The object code 114 and object code 114' depicted in FIG. 2 have the same content.

In some aspects, the development application 202 can be used to create, modify, or otherwise access source code 204 in a high-level programming language. The development application 202 can execute one or more compiler modules and thereby compile the source code 204 into assembly code 106. The assembly code 106 can include instructions that are specific to a target device 110 and that implement the functions specified by the source code 204. For example, compiling the source code 204 into the assembly code 106 can include converting the high-level programming functions specified in the source code 204 into executable instructions that are selected from a set of operations that can be performed by a specific target device 110.

In additional or alternative aspects, the development application 202 can be used to create, modify, or otherwise access assembly code 106 without using source code in a high-level programming language. For example, the development application 202 can include one or more features that a developer may use to directly draft and revise assembly code 106 that includes instructions that are specific to a target device 110 without requiring the use of a compiler module to compile source code into the assembly code 106.

The development application 202 can execute one or more assembler modules and thereby assemble the assembly code 106 into the object code 114'. The object code 114 can include one or more opcodes that are executable by the target device 110. The opcodes can be numeral representations of corresponding instructions from the assembly code 106. These numerical representations can control the processing circuitry of the target device 110.

The computing device 102 can provide the object code 114' to the target device 110 via a communication link 108. The target device 110 can store the received object code 114' in a non-transitory computer-readable medium as the object code 114.

In some aspects, the development application 202 can be executed on the same computing device 102 that executes the debugging application 104. In other aspects, the development application 202 can be executed on a computing device that is separate from the computing device 102 that executes the debugging application 104. In some aspects, the debugging application 104 can be a module of the development application 202. In other aspects, the debugging application 104 can be an application that is executable separately from the development application 202.

Figure 3:
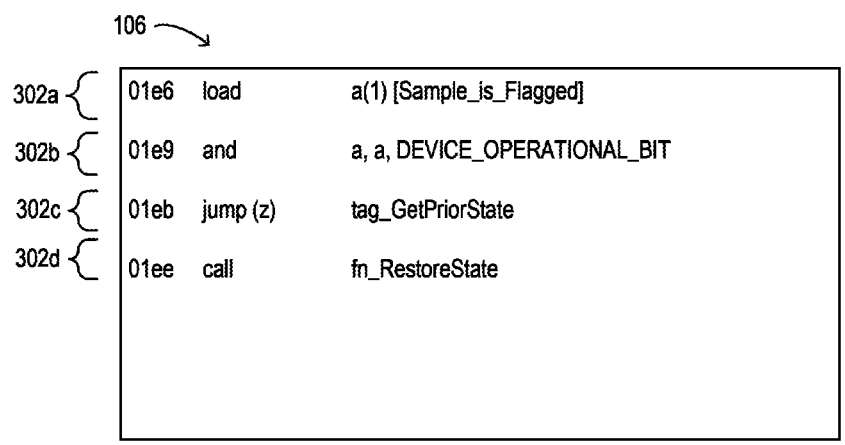
FIG. 3 depicts an example of assembly code that can be debugged using log data generated by executing object code.

FIG. 3 depicts an example of assembly code 106 that can be debugged using log data generated by executing object code 114. (For illustrative purposes, FIG. 3 depicts pseudo-code rather than functional source code for performing specific functions of a target device). The assembly code 106 includes assembly code portions 302a-d. Each of the assembly code portions 302a-d can be used to specify operations to be performed by a target device 110 that performs a given algorithm specified in the assembly code 106.

Figure 4:
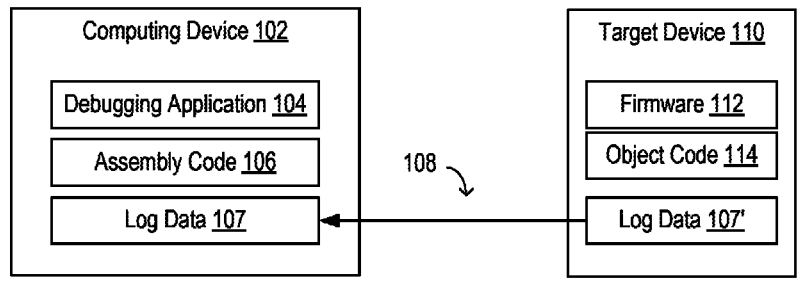
FIG. 4 is a block diagram illustrating an example of the computing device of FIG. 1 obtaining the log data from the target device that executes the object code.

The computing device 102 can obtain log data 107 that is generated by the execution of the object code 114 at the target device 110. For example, FIG. 4 is a block diagram illustrating an example of the computing device 102 obtaining the log data 107 from the target device 110. The target device 110 can execute the instructions included in the object code 114 to perform one or more operations (e.g., monitoring power usage, communicating with other devices, etc.). As a processing device of the target device 110 executes the object code 114, the values stored in different registers used by the processing device can change. For example, each operation performed by the processing device can include a different combination of values for a program counter, a flag register, an accumulator, and/or other registers used by the processing device. For each operation, the target device 110 can generate an entry in the log data 107' that includes the combination of register values representing the state of the target device 110. The log data 107' can be downloaded by the computing device 102 from the target device 110 via the communication link 108 and can be stored as log data 107 in a suitable non-transitory computer-readable medium that is accessible to a processing device of the computing device 102.

For illustrative purposes, FIG. 4 depicts a copy of the log data 107 that is stored on the computing device 102 and a copy of the log data 107' that is stored on the target device 110. In some aspects, the log data 107 can be the same as the log data 107'. For example, the computing device 102 can be communicatively coupled to the target device 110 while the target device 110 executes the object code 114. The log data 107' can be transmitted to the computing device 102 nearly simultaneously with its generation such that the log data 107 is identical to the log data 107'. In other aspects, the log data 107 can be different from the log data 107'. For example, log data can be downloaded from the target device 110 to the computing device 102. The data that is downloaded to the computing device 102 and stored as log data 107 can be erased from the target device 110 after downloading. New log data 107' can be generated after the download such that the log data 107 is different from the log data 107'.

Figure 5:
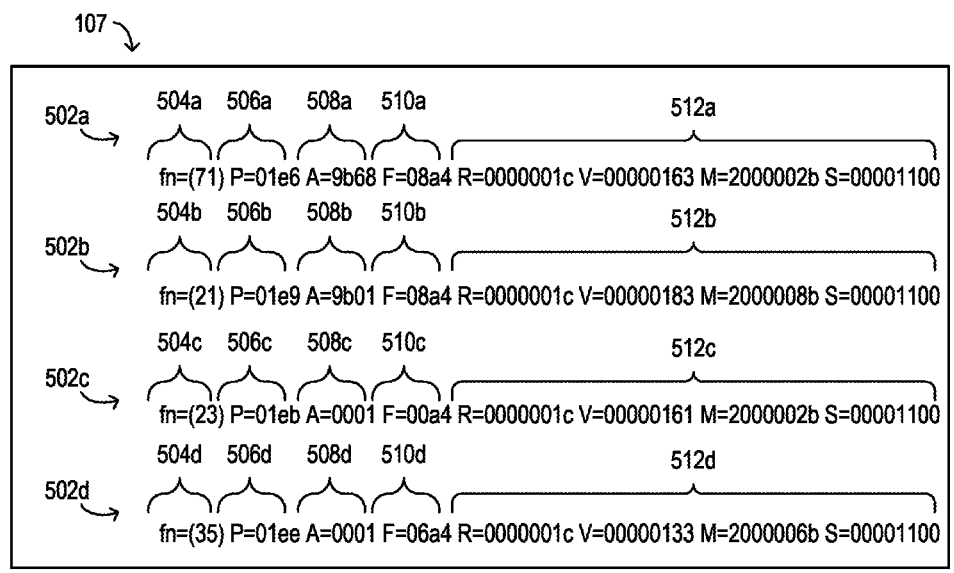
FIG. 5 depicts an example of log data generated by executing object code.

FIG. 5 depicts an example of log data 107 that is generated by executing the object code 114. The log data 107 includes entries 502a-d. Each of the entries 502a-d corresponds to a state of a processing device of the target device 110 as the object code 114 was executed by the processing device. For example, the entries 502a-d respectively include opcode values 504a-d, program counter values 506a-d, accumulator register values 508a-d, flag register values 510a-d, and other register values 512a-d. Each of the opcode values 504a-d identifies a respective opcode for a command executed by the processing device of the target device 110. Each of the program counter values 506a-d can identify an address of a current instruction or subsequent instruction that is being executed by the processing device of the target device 110. Each of the accumulator register values 508a-d is an intermediate value generated by a logical or arithmetic operation performed by the processing device of the target device 110. Each of the flag register values 510a-d is a value indicating a current state of the processing device of the target device 110. Each of the other register values 512a-d can include other values used by the processing device of the target device 110 to perform one or more operations (e.g., interim values from arithmetic operations, etc.). Each combination of values in a respective one of the entries 502a-d can represent a state of a processing device of the target device 110 at a given point in time during execution of the object code 114.

Figure 6:
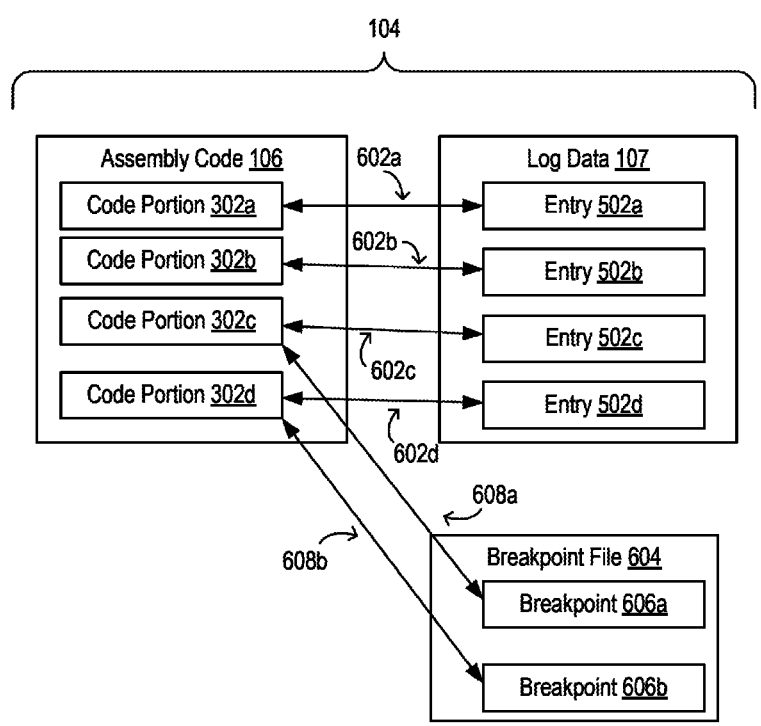
FIG. 6 is a block diagram illustrating an example of a debugging application generating associations among the assembly code, the log data, and a breakpoint file.

The debugging application 104 can associate entries 502a-d from the log data 107 with portions 302a-d of the assembly code 106 such that the log data 107 can be used to simulate execution of the object code 114. For example, FIG. 6 is a block diagram illustrating an example of the debugging application 104 generating associations 602a-d among the assembly code 106 and the log data 107. Each of the associations 602a-d indicates that a respective one of the assembly code portions 302a-d corresponds to one or more of the entries 502a-d.

Each of the entries 502a-d ultimately corresponds to a respective one of the assembly code portion 302a-d that specifies one or more functions that resulted in the log entry. For example, assembling the assembly code portion 302a into the object code 114 and executing the object code 114 can cause the target device 110 to perform the operations that generated the entry 502a, as indicated by the association 602a. Assembling the assembly code portion 302b into the object code 114 and executing the object code 114 can cause the target device 110 to perform the operations that generated the entry 502b, as indicated by the association 602b. Assembling the assembly code portion 302c into the object code 114 and executing the object code 114 can cause the target device 110 to perform the operations that generated the entry 502c, as indicated by the association 602c. Assembling the assembly code portion 302d into the object code 114 and executing the object code 114 can cause the target device 110 to perform the operations that generated the entry 502d, as indicated by the association 602d.

The associations 602a-d depicted in FIG. 6, some of which indicate a one-to-one correspondence between the assembly code portions depicted in FIG. 3 and the log data entries depicted in FIG. 5, are provided for illustrative purposes. In practice, multiple entries in log data may be generated as a result of an operation specified by a given portion of assembly code and/or associated source code.

The debugging application 104 can generate, identify, or otherwise determine the associations 602a-d between assembly code portions 302a-d and entries 502a-d. The assembly code 106 includes program counter values for each instruction that is to be executed by a processing device. The debugging application 104 can parse each entry of the log data 107 to identify each of the program counter values 506a-d. For example, the debugging application 104 can search for values between "P=" and "A=" to identify a given program counter value. The debugging application 104 can automatically search the assembly code 106 or associated data to identify a matching program counter value for an instruction in the assembly code 106. For example, assembling the assembly code 106 into the object code 114 can involve generating an assembler listing file. The assembler listing file can include program counters for each instruction from the assembly code 106. The debugging application 104 can search the assembler listing file for specific program counter values to match one or more entries from the log data 107 to corresponding portions of the assembly code 106 and/or its associated source code.

In additional or alternative aspects in which the source code 204 is used to generate the assembly code 106, the debugging application 104 can determine that the identified instruction in the assembly code 106 is generated from a given portion of the source code 204. This determination can be performed in any suitable manner. For example, the debugging application 104 can access additional log data generated by a compiler of the development application 202 that compiled the source code 204 into the assembly code 106. This log data from the compilation process can be used by the debugging application 104 to identify which portion of the source code 204 was used to generate an instruction in the assembly code 106 having a given program counter value that matches a given entry from the log data 107.

In additional or alternative aspects, the debugging application 104 can use opcode values 504a-d to generate, identify, or otherwise determine the associations 602a-d between assembly code portions 302a-d and entries 502a-d. The debugging application 104 can parse each entry of the log data 107 to identify each of the opcode values 504a-d. For example, the debugging application 104 can search for values between "fn=" and "P=" to identify a given opcode value. The debugging application 104 can automatically search the assembly code 106 to identify a matching opcode value for an instruction in the assembly code 106. For example, the opcode value can be included in an assembler listing file that is generated when assembling the assembly code 106 into the object code 114 and that includes data matching opcodes to assembly code portions.

In some aspects, the debugging application 104 can also use a breakpoint file 604 to associate one or more of the assembly code portions 302a-d with one or more breakpoint commands 606a, 606b. Each of the breakpoint commands 606a, 606b can cause the debugging application 104 to pause a simulated execution of the object code 114, as described below with respect to FIGS. 7-9. A given one of the breakpoint commands 606*a*, 606*b* can be associated with a given one of the assembly code portions 302*a-d*. Using the breakpoint file 604 can allow the simulated executions described in FIGS. 7-9 to be paused without requiring breakpoints to be inserted in the assembly code 106 or the corresponding object code 114.

For illustrative purposes, FIG. 6 depicts the breakpoint commands 606*a*, 606*b* as being directly associated with assembly code portions 302*c*, 302*d*. However, other implementations are possible. In some aspects, a breakpoint file 604 can include mappings between specific program counter values and breakpoint commands. For example, the program counter value 506*c* from the log entry 502*c* can be associated with the breakpoint command 606*a*, and the program counter value 506*d* from the log entry 502*d* can be associated with the breakpoint command 606*b*. During a simulated execution of the object code 114, the debugging application 104 can determine that a given program counter, which is associated with a given portion of assembly code and/or its associated source code, is mapped to or otherwise corresponds to a breakpoint command. The debugging application 104 can respond to determining that the program counter is mapped to or otherwise corresponds to the breakpoint command by pausing the simulated execution. The debugging application 104 can use one of the associations 602*a-d* to identify the assembly code portion and/or source code portion associated with the program counter that caused the pause. The debugging application 104 can visually indicate the identified code portion in a suitable interface. Visually indicating the identified code portion can include, for example, displaying the identified code portion in the interface, highlighting the identified code portion in the interface to distinguish the identified source code portion from other displayed code portions, or using any other visual cue to distinguish the identified code portion.

The associations 602*a-d*, 608*a*, 608*b*, can be stored in any suitable manner, such as (but not limited to) a database that includes breakpoint file 604 and or other data files. For example, a file that includes the assembly code 106 can include metadata that identifies different assembly code portions 302*a-d*. Identifiers in the metadata can be used to indicate that a given portion of the assembly code and/or its associated source code is located in the file at a given location. The location can be specified in any suitable manner (e.g., a pair of line numbers in the file identifying the start and end of a given code portion, a set of memory blocks from the file that include the given code portion, etc.). Each of the associations 602*a-d* can include a mapping between a given program counter value and/or other data from one of the entries 502*a-d* and an identifier of an assembly code portion (and/or its associated source code portion) from the metadata of the file that includes the assembly code 106. In additional or alternative aspects, each of the associations 608*a*, 608*b* can include a mapping between one of the breakpoint commands 606*a*, 606*b* and a respective program counter value that is associated with one of the assembly code portions 302*a-d*. In additional or alternative aspects, each of the associations 608*a*, 608*b* can include a mapping between a breakpoint command and an identifier of an assembly code portion (and/or its associated source code portion) from the metadata of the file that includes the assembly code 106.

The log data 107 and the associations depicted in FIG. 6 can be used by the debugging application 104 to simulate an execution of the object code 114. For example, the debugging application 104 can include one or more software modules that emulate the behavior of a specific processing device used by the target device 110. Emulating the behavior of a specific processing device used by the target device 110 can include emulating instruction sets that are executable by the processing device and the registers used by the processing device. The debugging application 104 can use the log data 107 to simulate the execution of the object code 114. For example, for each of the entries 502*a-d*, the debugging application 104 can cause the emulated processing device to execute an instruction identified by one or more of the opcode values 504*a-d* and/or the program counter values 506*a-d* using emulated register values obtained from one or more of the register values 508*a-d*, 510*a-d*, 512*a-d*. During the simulation, the debugging application 104 can use the program counter values 506*a-c* to identify respective assembly code portions 302*a-d* using the associations 602*a-c*. The debugging application 104 can also use the associations 608*a*, 608*b* to determine if a code portion (e.g., an assembly code portion and/or its associated source code portion) that corresponds to a given operation in the simulated execution is associated with a breakpoint command. If so, the debugging application 104 can pause the simulated execution. If not, the debugging application 104 can continue the simulated execution.

Figure 7:
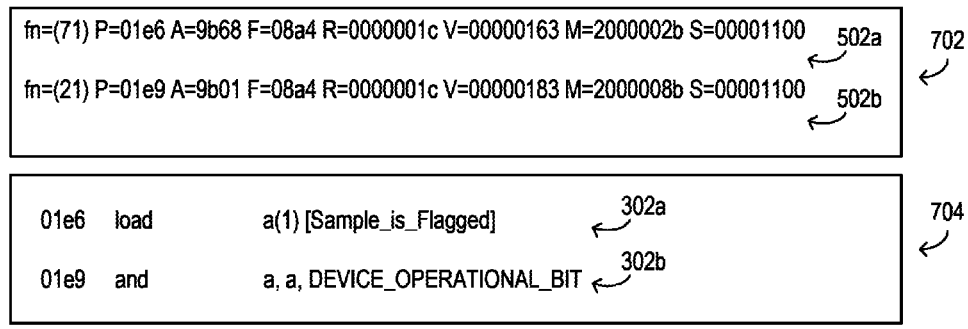
FIG. 7 is a diagram depicting an example of interfaces used to display log data and associated assembly code during a simulation of executed object code.
Figure 8:
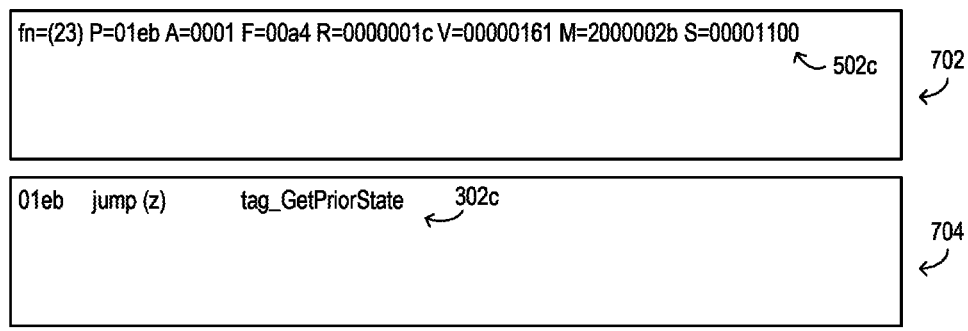
FIG. 8 is a diagram depicting an example of updated interfaces from FIG. 7.

FIGS. 7 and 8 depict examples of interfaces 702, 704 that can be used during a simulated execution of the object code 114. The interfaces 702, 704 can be generated by the debugging application 104. The debugging application 104 can configure a display device, which may be included or communicatively coupled to the computing device 102, to render the interfaces 702, 704 for display.

The interfaces 702, 704 can be used to display entries from the log data 107 and assembly code portions (and/or associated source code portions) corresponding to the log entries. For example, FIG. 7 depicts the interface 702 displaying the entries 502*a*, 502*b* and depicts the interface 704 displaying the corresponding assembly code portions 302*a*, 302*b*. A correspondence between the assembly code portions 302*a*, 302*b* and the respective entries 502*a*, 502*b* can be determined using the associations 602*a*, 602*b*, as described above. FIG. 8 depicts the interface 702 displaying the entry 502*c* and the interface 704 displaying the corresponding assembly code portion 302*c*. A correspondence between the assembly code portion 302*c* and the entry 502*c* can be determined using the association 602*c*, as described above.

Figure 9:
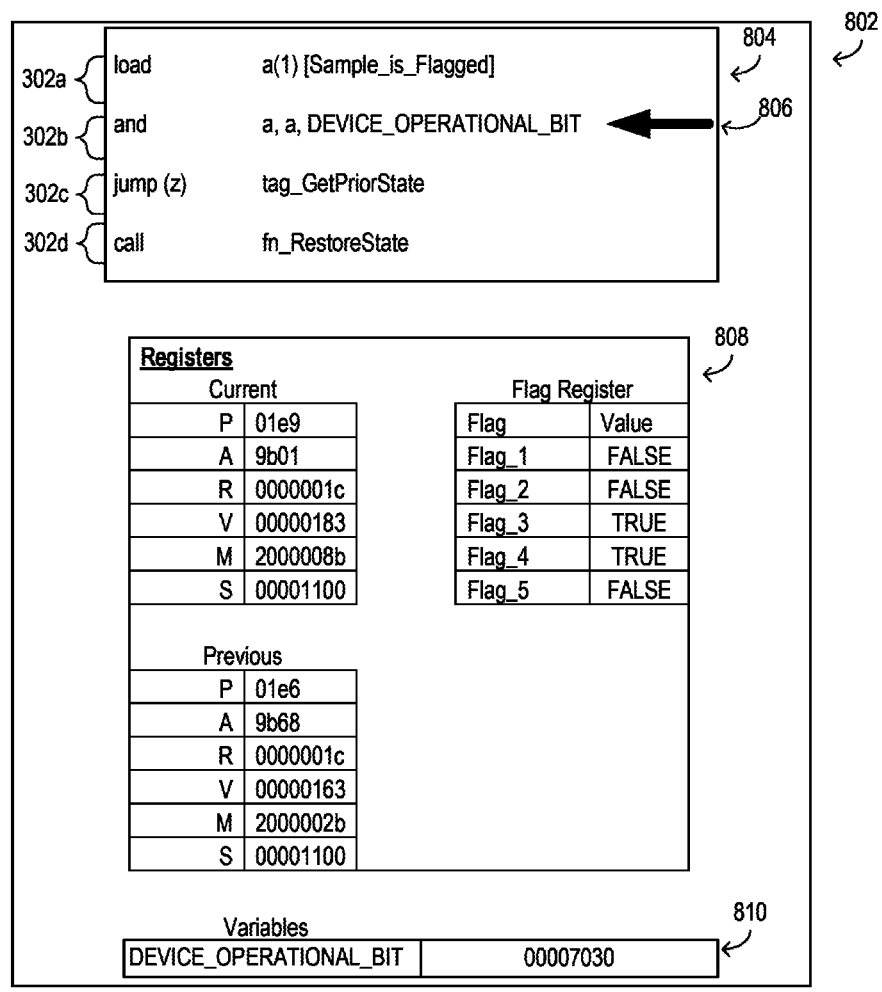
FIG. 9 is a diagram depicting another example of an interface used to display log data and associated assembly code during a simulation of executed object code.

FIG. 9 is a diagram depicting another example of an interface 802 used to display indicators of the log data 107 and the associated assembly code 106 during a simulation of executed object code 114. The interface 802 depicted in FIG. 9 includes regions 804, 808, 810.

The region 804 is used to depict at least some of the assembly code 106. For example, as depicted in FIG. 9, assembly code portions 302*a-d* are displayed in the region 804. A visual indicator 806 is used to identify a current assembly code portion being simulated. Although FIG. 9 depicts the visual indicator 806 as a bold arrow, any suitable visual indicia (e.g., highlighting, bold text, colored text, etc.) can be used to identify a current assembly code portion being simulated.

The region 808 is used to display one or more register values for one or more simulated source code portions. For example, in FIG. 9, the region 808 depicts register values obtained from the log data and corresponding to the assembly code portion 302*b* (i.e., the "current" instruction identified by the visual indicator 806). The current register values are obtained from the entry 502*b* and include the program counter value 506*b* (i.e., "01e9"), the accumulator register value 508*b* (i.e., "9b01"), and additional register values 512*b* (i.e., "0000001c, "00000183," "2000008b," and "00001100"). The region 808 also includes a set of flag register codes obtained from the flag register value 510*b* of the entry 502*b*. The region 808 depicted in FIG. 8 also displays at least some previous register values corresponding to the assembly code portion 302*a* whose execution was simulated prior to the assembly code portion 302*b*. The previous register values are obtained from the entry 502*a* and include the program counter value 506*a* (i.e., "01e6"), the accumulator register value 508*a* (i.e., "9b68"), and additional register values 512*a* (i.e., "0000001c, "00000163," "2000002b," and "00001100"). The region 804 is used to depict at least some of the assembly code 106.

The region 810 is used to identify one or more variables from the current instruction and their corresponding values. For example, as depicted in FIG. 9, the debugging application 104 can determine that a current assembly code portion 302*b* being simulated includes the variable "DEVICE OPERATIONAL BIT." The debugging application 104 determines the value of the "DEVICE OPERATIONAL BIT" variable from the assembly code 106 and displays the value in the region 810.

The interfaces 702, 704, 802 depicted in FIGS. 7-9 are provided for the sake of illustration. Other implementations are possible. In some aspects, multiple assembly code portions and/or associated source code portions can be presented in an interface 702. Highlighting or other visual indicia can be used to distinguish a given code portion a (e.g., a source code portion and/or assembly code portion whose corresponding program counter caused a pause in the simulation) from other code portions.

The simulated execution can also be paused at the state depicted in one or more of FIGS. 7-9 based on determining that a given assembly code portion is associated with a breakpoint command. Pausing the simulated execution can allow behavior of the target device 110 that is associated with the assembly code 106 to be analyzed. For example, pausing the simulated execution can allow the register values included in entry 502*c* to be inspected using the interface 702.

In additional or alternative aspects, one or more suitable interfaces can be generated that simulate additional aspects of the execution of the object code 114 by the target device 110. For example, an additional interface can provide a graphical representation of operations performed by the target device 110 (e.g., transmitting a signal, outputting data, etc.) as a result of executing a given instruction or set of instructions specified in the object code 114. The additional interface can allow a developer to identify the effects of specific assembly code portions and/or associated source code portions on operations of the target device 110.

Figure 10:
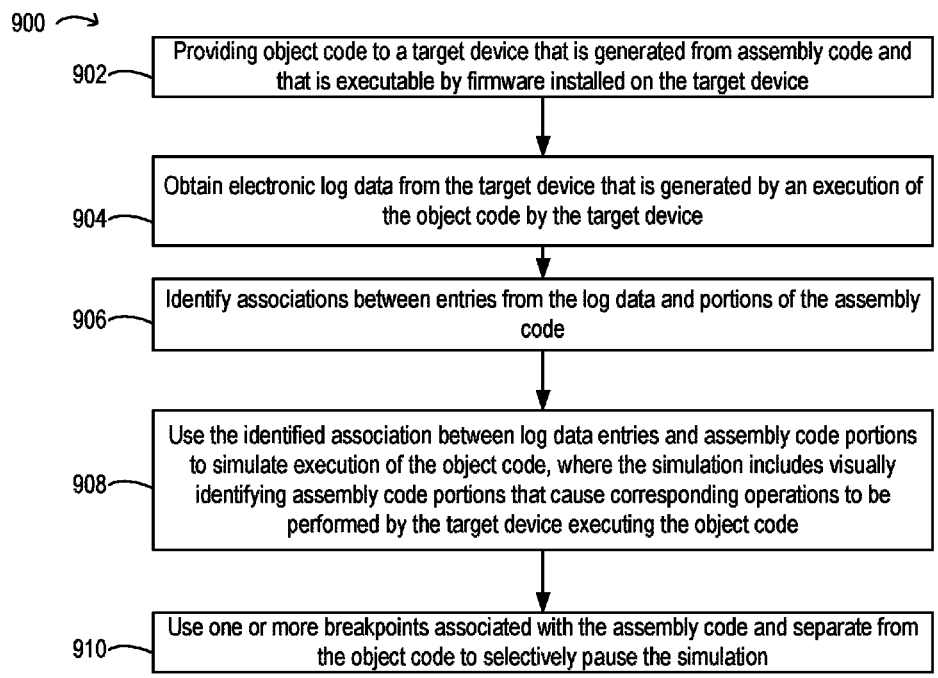
FIG. 10 is a flow chart depicting an example of a method for debugging assembly code for controlling intelligent devices using log data from executed object code.

FIG. 10 is a flow chart depicting an example of a method 900 for debugging code using log data 107 generated from executed object code 114. For illustrative purposes, the method 900 is described with reference to the implementation depicted in FIGS. 1-9. Other implementations, however, are possible.

The method 900 involves providing object code 114 to a target device 110 that is generated from assembly code 106 and that is executable by firmware 112 installed on the target device 110, as shown in block 902.

For example, one or more suitable processing devices can execute program code that includes the development application 202. Executing the development application 202 can configure the processing device to perform one or more operations. In some aspects, the operations can include generating the assembly code 106. The assembly code 106 can include a set of instructions that are specific to a processing device of the target device 110 and program counter values that correspond to respective instructions. The operations can also include assembling the assembly code 106 into the object code 114, as described above with respect to FIG. 2. The object code 114 can include opcodes that are executable by the processing device of the target device 110. In some aspects in which source code 204 is used to generate assembly code 106, the operations can include compiling the source code 204 into the assembly code 106, as described above with respect to FIG. 2.

A suitable computing device can transmit the object code 114 to the target device 110 via a suitable communication link 108. For example, a computing device 102 can be communicatively coupled to the target device 110 via a serial data connection. The computing device 102 can transmit the object code 114 to the target device 110 as byte-oriented data via the serial data connection. The target device 110 can receive the object code 114 and store the object code 114 in a non-transitory computer-readable medium.

The method 900 also involves obtaining electronic log data 107 from the target device 110 that is generated by an execution of the object code 114 by the target device 110, as shown in block 904.

For example, the target device 110 can be configured by the firmware 112 to execute the object code 114. Executing the object code 114 can cause the target device 110 to generate log data 107. The log data 107 can be stored to a non-transitory computer-readable medium of the target device 110.

The target device 110 can transmit the log data 107 to the computing device 102 via a suitable communication link 108. For example, the computing device 102 can be communicatively coupled to the target device 110 via a serial data connection. The target device 110 can transmit the log data 107 to the computing device 102 as byte-oriented data via the serial data connection. The computing device 102 can receive the log data 107 and store the log data 107 in a non-transitory computer-readable medium.

The method 900 also involves identifying associations 602*a-d* between entries 502*a-c* from the log data 107 and portions 302*a-d* of the assembly code 106, as shown in block 906. For example, one or more suitable processing devices of the computing device 102 can execute program code that includes the debugging application 104. Executing the debugging application 104 can configure the processing device to perform one or more operations. The operations can include generating the associations 602*a-d* as described above with respect to FIG. 6.

The method 900 also involves using the identified associations between log data 107 entries and assembly code 106 portions to simulate execution of the object code 114, as shown in block 908. For example, one or more suitable processing devices of the computing device 102 can execute program code that includes the debugging application 104. Executing the debugging application 104 can configure the processing device to perform one or more operations. The operations can include simulating the execution of the object code 114 using the log data, as described above with respect to FIG. 6. The operations can also include generating or updating one or more of the interfaces 702, 704, 802 and configuring a display device to display one or more of the interfaces 702, 704, 802 as described above with respect to FIGS. 7-9. In some aspects, the simulation can include visually identifying portions of assembly code 106 that cause corresponding operations to be performed by the target device 110 executing the object code 114. In additional or alternative aspects, the simulation can include visually identifying portions of source code 204 that, when used to generate object code 114 from assembly code 106, cause corresponding operations to be performed by the target device 110 executing the object code 114.

The method 900 also involves using one or more breakpoints associated with the assembly code 106 and separate from the object code 114 to selectively pause the simulation, as shown in block 910. For example, one or more suitable processing devices of the computing device 102 can execute program code that includes the debugging application 104. Executing the debugging application 104 can configure the processing device to perform one or more operations. The operations can include generating the associations 608a, 608b between assembly code portions and breakpoint commands, as described above with respect to FIG. 6. The operations can also include pausing a simulated execution of the object code 114. The simulated execution can be paused based on the debugging application 104 determining that a given one of the assembly code portions 302a-d, which is identified by the debugging application 104 using a program counter from the log data 107, is associated with one of the breakpoint commands 606a, 606b as specified in the breakpoint file 604.

In some aspects, the debugging application 104 can perform the simulated execution using log data 107 simultaneously with the target device executing the object code 114. For example, the log data 107 can be generated by the target device 110 and provided to the computing device 102 over the communication link 108. The computing device 102 can perform the simulated execution using the log data 107 received from the target device 110. Performing the simulated execution using the log data 107 can allow the simulated execution to be paused using the breakpoint file 604 without affecting the operation of the target device 110. Thus, the execution of the object code at the target device 110 can continue independently of the simulated execution being paused at the computing device 102.

The computing device 102 and the target device 110 can be implemented in any suitable manner. For example, FIG. 11 is a block diagram depicting examples of implementations for the computing device 102 and the target device 110.

The computing device 102 and the target device 110 can respectively include processors 1002, 1012. Non-limiting examples of the processors 1002, 1012 include a microprocessor, a field-programmable gate array ("FPGA") an application-specific integrated circuit ("ASIC"), a state machine, or other suitable processing device. Each of the processors 1002, 1012 can include any number of processing devices, including one. The processors 1002, 1012 can be communicatively coupled to computer-readable media, such as memory devices 1004, 1014.

One or both of the memory devices 1004, 1014 can store program code that, when executed by the processors 1002, 1012, causes a respective one of the processors 1002, 1012 to perform operations described herein. Each of the memory devices 1004, 1014 may include one or more non-transitory computer-readable media such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. Examples of the program code include the debugging application 104 stored in the memory device 1004, and the firmware 112 and object code 114 stored in the memory device 1014. The program code may include processor-specific instructions generated by a compiler and/or an interpreter from code written in any suitable computer-programming language. Non-limiting examples of suitable computer-programming languages include C, C++, C#, VISUAL BASIC, JAVA, PYTHON, PERL, JAVASCRIPT, ACTIONSCRIPT, and the like.

Figure 11:
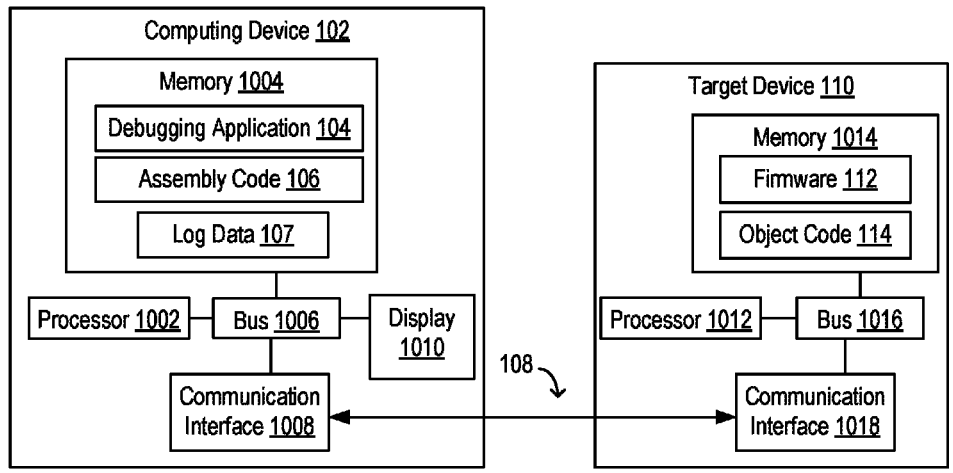
FIG. 11 is a block diagram depicting examples of implementations for devices used to debug code using log data from executed object code.

The computing device 102 and the target device 110 depicted in FIG. 11 respectively include buses 1006, 1016. Each of the buses 1006, 1016 can communicatively couple one or more components of a respective one of the computing device 102 and the target device 110. Each of the buses 1006, 1016 can communicate input events and output events among components of the computing device 102 and the target device 110, respectively. For example, the computing device 102 can include one or more input devices and one or more output devices, such as a display device 1010. The one or more input devices and one or more output devices can be communicatively coupled to the bus 1006. The communicative coupling can be implemented via any suitable manner (e.g., a connection via a printed circuit board, connection via a cable, communication via wireless transmissions, etc.). Non-limiting examples of a display device 1010 include an LCD screen, an external monitor, a speaker, or any other device that can be used to display or otherwise present outputs generated by a computing device 102.

Although the processors 1002, 1012, the memory devices 1004, 1014, and the buses 1006, 1016 are respectively depicted in FIG. 11 as separate components in communication with one another, other implementations are possible. For example, the processors 1002, 1012, the memory devices 1004, 1014, and the buses 1006, 1016 can be respective components of respective printed circuit boards or other suitable devices that can be included in a computing device 102 and/or a target device 110.

The computing device 102 and the target device 110 can also include respective communication interfaces 1008, 1018. The communication interfaces 1008, 1018 can be configured to establish a communication link 108. Non-limiting examples of the communication interfaces 1008, 1018 include serial data ports that can be used to communicate data using a byte-oriented protocol.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these, and similar terms, are to be associated with appropriate physical quantities and are merely convenient labels. Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulates or transforms data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method for simulating operations performed by a device that is controlled using program code without including breakpoints in the program code, the method comprising:

transmitting object code from a computing device to a radio device deployed in a mesh network, wherein the object code is generated from assembly code and is executable by firmware installed on the radio device;

obtaining, by the computing device, electronic log data from the radio device via a communication link with the radio device, wherein the electronic log data is generated by an execution of the object code by the radio device and comprises a plurality of program counter entries, wherein the execution of the object code causes the radio device to perform resource-monitoring operations based on communication with other devices in the mesh network; and for each program counter entry of the plurality of program counter entries:

identifying, by the computing device separate from the radio device, a correspondence between the program counter entry and a respective portion of the assembly code, simulating, using the electronic data, by the computing device, a respective operation from the resource-monitoring operations that is performed by the execution of the object code at the radio device and that corresponds to the program counter entry, wherein the simulation is simultaneous with the execution of the object code at the radio device and comprises configuring a display device of the computing device to display a respective visual indicator for the assembly code that caused the respective operation, wherein the respective visual indicator is displayed by the computing device based on identifying the correspondence between the respective portion of the assembly code and the program counter entry accessed from the electronic log data, and pausing, by the computing device, the simulation based on a determination of a correspondence between (i) a particular program counter in the electronic log data and (ii) an assembly code portion of the assembly code, the assembly code portion being associated with a breakpoint that is separate from the object code and the assembly code, wherein the execution of the object code at the radio device continues independently of the simulation being paused at the computing device.

2. The method of claim 1, wherein the electronic log data further comprises a plurality of register values, wherein each of the plurality of register values corresponds to a respective one of the plurality of program counter entries, wherein the correspondence between the program counter entry and the respective portion of the assembly code is also identified based on a respective register value corresponding to the program counter entry.

3. The method of claim 1, further comprising:
associating the breakpoint with assembly code portion, wherein the breakpoint is associated with assembly code portion such that the object code executes without the breakpoint;
performing the determination of the correspondence by determining, during the simulation of operations performed by the object code, that a particular operation from the resource-monitoring operations performed by the execution of the object code corresponds to the particular program counter and that the particular program counter corresponds to the assembly code portion that is associated with the breakpoint.

4. The method of claim 3, wherein associating the breakpoint with the assembly code portion such that the object code executes without the breakpoint comprises storing the breakpoint in a data file that is separate from the assembly code or source code from which the assembly code is generated.

5. The method of claim 4, wherein associating the breakpoint with the assembly code portion comprises storing a mapping between a pause command and the particular program counter entry, wherein determining that the particular operation corresponds to the assembly code portion comprises:
accessing the particular program counter entry from the electronic log data;
determining that the accessed program counter entry is identified in the mapping; and
pausing the simulation in response to determining that the accessed program counter entry is identified in the mapping.

6. The method of claim 1, wherein the communication link comprises a serial data connection and the computing device obtains the electronic log data from the radio device as byte-oriented communication data received via the serial data connection with the radio device.

7. A computing system comprising:
a processing device; and
a non-transitory computer-readable medium communicatively coupled to the processing device,
wherein the processing device is configured for executing program code stored in the non-transitory computer-readable medium to perform operations comprising:
transmitting object code to a radio device deployed in a mesh network, wherein the object code is generated from assembly code and is executable by firmware installed on the radio device,
obtaining electronic log data from the radio device via a communication link with the radio device, wherein the electronic log data is generated by an execution of the object code by the radio device and comprises a plurality of program counter entries, wherein the execution of the object code causes the radio device to perform resource-monitoring operations based on communication with other devices in the mesh network, and
for each program counter entry of the plurality of program counter entries:
identifying a correspondence between the program counter entry and a respective portion of the assembly code,
simulating, using the object code, a respective operation from the resource-monitoring operations that is performed by the execution of the object code at the radio device and that corresponds to the program counter entry, wherein the simulation is simultaneous with the execution of the object code at the radio device and comprises configuring a display device of the computing system to display a respective visual indicator for the respective portion of the assembly code that caused the respective operation, wherein the respective visual indicator is displayed based on identifying the correspondence between the respective portion of the assembly code and the program counter entry accessed from the electronic log data, and
pausing the simulation based on a determination of a correspondence between (i) a particular program counter in the electronic log data and (ii) an assembly code portion of the assembly code, the assembly code portion being associated with a breakpoint that is separate from the object code and the assembly code, wherein the simulation being paused at the computing system is independent of the execution of the object code continuing at the radio device.

8. The system of claim 7, wherein the electronic log data further comprises a plurality of register values, wherein each of the plurality of register values corresponds to a respective one of the plurality of program counter entries, wherein the correspondence between the program counter entry and the respective portion of the assembly code is also identified based on a respective register value corresponding to the program counter entry.

9. The system of claim 7, wherein the operations further comprise:
associating the breakpoint with the assembly code portion, wherein the breakpoint is associated with the assembly code portion such that the object code executes without the breakpoint; and
performing the determination of the correspondence by determining, during the simulation of operations performed by the object code, that a particular operation from the resource-monitoring operations performed by the execution of the object code corresponds to the particular program counter and that the particular program counter corresponds to the assembly code portion that is associated with the breakpoint.

10. The system of claim 9, wherein associating the breakpoint with the assembly code portion such that the object code executes without the breakpoint comprises storing the breakpoint in a data file that is separate from the assembly code or source code from which the assembly code is generated.

11. The system of claim 10, wherein associating the breakpoint with the assembly code portion comprises storing a mapping between a pause command and the particular program counter entry, wherein determining that the particular operation corresponds to the assembly code portion comprises:
accessing the particular program counter entry from the electronic log data;
determining that the accessed program counter entry is identified in the mapping; and
pausing the simulation in response to determining that the accessed program counter entry is identified in the mapping.

12. The system of claim 7, wherein the communication link comprises a serial data connection and the computing system is configured for obtaining the electronic log data from the radio device as byte-oriented communication data received via the serial data connection with the radio device.

13. A non-transitory computer-readable medium having program code stored thereon that is executable by a processing device, the program code comprising:
  program code for transmitting object code from a computing device to a radio device deployed in a mesh network, wherein the object code is generated from assembly code and is executable by firmware installed on the radio device;
  program code for obtaining, by the computing device, electronic log data from the radio device via a communication link with the radio device, wherein the electronic log data is generated by an execution of the object code by the radio device and comprises a plurality of program counter entries, wherein the execution of the object code causes the radio device to perform resource-monitoring operations based on communication with other devices in the mesh network; and
  program code for performing, for each program counter entry of the plurality of program counter entries, operations comprising:
    identifying, by the computing device separate from the radio device, a correspondence between the program counter entry and a respective portion of the assembly code, and
    simulating, using the electronic log data and by the computing device, a respective operation from the resource-monitoring operations that is performed by the execution of the object code at the radio device and that corresponds to the program counter entry, wherein the simulation is simultaneous with the execution of the object code at the radio device and comprises configuring a display device of the computing device to display a respective visual indicator for the respective portion of the assembly code that caused the respective operation, wherein the respective visual indicator is displayed by the computing device based on identifying the correspondence between the respective portion of the assembly code and the program counter entry accessed from the electronic log data, and
    pausing, by the computing device, the simulation based on a determination of a correspondence between (i) a particular program counter in the electronic log data and (ii) an assembly code portion of the assembly code, the assembly code portion being associated with a breakpoint that is separate from the object code and the assembly code, wherein the simulation being paused at the computing device is independent of the execution of the object code continuing at the radio device.

14. The non-transitory computer-readable medium of claim 13, wherein the electronic log data further comprises a plurality of register values, wherein each of the plurality of register values corresponds to a respective one of the plurality of program counter entries, wherein the correspondence between the program counter entry and the respective portion of the assembly code is also identified based on a respective register value corresponding to the program counter entry.

15. The non-transitory computer-readable medium of claim 13, further comprising:
  associating the breakpoint with the assembly code portion, wherein the breakpoint is associated with the assembly code portion such that the object code executes without the breakpoint;
  performing the determination of the correspondence by determining, during the simulation of operations performed by the object code, that a particular operation from the resource-monitoring operations performed by the execution of the object code corresponds to the particular program counter and that the particular program counter corresponds to the assembly code portion that is associated with the breakpoint.

16. The non-transitory computer-readable medium of claim 15, wherein associating the breakpoint with the assembly code portion such that the object code executes without the breakpoint comprises storing the breakpoint in a data file that is separate from the assembly code or source code from which the assembly code is generated.

17. The non-transitory computer-readable medium of claim 16, wherein associating the breakpoint with the assembly code portion comprises storing a mapping between a pause command and the particular program counter entry, wherein determining that the particular operation corresponds to the assembly code portion comprises:
  accessing the particular program counter entry from the electronic log data;
  determining that the accessed program counter entry is identified in the mapping; and
  pausing the simulation in response to determining that the accessed program counter entry is identified in the mapping.

* * * * *